United States Patent Office 2,970,994
Patented Feb. 7, 1961

2,970,994
WATER-INSOLUBLE PHENYLAZOINDOLE DYES

Winfried Kruckenberg, Leverkusen, Germany, assignor to Farbenfabriken Bayer Aktiengesellschaft, Leverkusen, Germany, a corporation of Germany No Drawing. Filed June 3, 1958, Ser. No. 739,483

Claims priority, application Germany June 26, 1957

3 Claims. (Cl. 260—165)

The present invention relates to water-insoluble monoazo dyestuffs and to a process for their manufacture; more particularly it relates to monoazo dyestuffs corresponding to the formula $$R-N=N-R_1$$

wherein R means a benzene radical containing at least one cyano group, $R_1$ stands for an indole radical, the radicals R and $R_1$ being free of sulfonic acid and carboxylic acid groups.

The new monoazo dyestuffs are obtainable by coupling diazotized cyananilines which may have further non-water-solubilizing substituents, with indoles free of sulfonic acid and carboxylic acid groups.

Suitable diazo components for the manufacture of the new dyestuffs are for example:

1-amino-2-cyan-4-nitrobenzene,
1-amino-2,4-dicyanbenzene,
1-amino-2-cyan-5-chlorobenzene,
1-amino-2,5-dicyanbenzene,
1-amino-3-chloro-4-cyanbenzene,
1-amino-2,4-dicyan-5-chlorobenzene.

As azo components there may be considered, in addition to indole itself, substitution products thereof which are free of sulfonic acid and carboxylic acid groups, such as 2-methylindole, 2-phenylindole, 1,2-dimethylindole and their derivatives substituted in the aromatic nucleus by non-water-solubilizing groups.

The dyestuffs obtainable according to the present process are suitable for the dyeing of and printing aromatic polyesters especially of articles such as fibres, filaments, films etc., made from polyethyleneterephthalates, and for the dyeing of acetate rayon, and in some cases also for the dyeing of polyamide fibres. They distinguish themselves particularly on fabrics from polyethylene-terephthalates, by a good fastness to sublimation and to light.

The following examples are given for the purpose of illustrating the invention without, however, limiting it thereto.

Example 1

15.3 grams of 1-amino-3-chloro-4-cyanbenzene are dissolved in 150 millilitres of water and 35 millilitres of concentrated hydrochloric acid, the solution is cooled to about 0–5° C. and diazotized by the addition, with stirring, of 6.9 grams of sodium nitrate dissolved in water. This solution is poured into a hydrochloric solution of 13.1 grams of 2-methylindole cooled to 0–10° C. After some time, the reaction mixture is rendered neutral to Congo with sodium bicarbonate. The dyestuff thus formed is filtered off with suction, washed with water and dried.

25 grams of polyester fibres are introduced at 50° C. into a dyebath of 4 litres containing 4 grams of a polyglycol ether emulsifier and 4 grams of the thoroughly dispersed dyestuff (referred to the weight of the dyeing material) and also 16 grams of a carrier such as benzoic acid, and 20 grams of diammonium phosphate. The bath is brought to the boil within 30 minutes and dyeing is continued at this temperature for 1½ to 2 hours. The dyeing is then washed alkaline at 70° C. for 20 minutes, rinsed and dried. A clear greenish yellow dyeing is thus obtained which is fast to light and washing and distinguishes itself by a good fastness to sublimation.

Example 2

1 percent of the dyestuff 1-amino-3-chloro-4-cyanbenzene→2-phenylindole (referred to the amount of dyeing material used), produced in a manner similar to the process of Example 1, is finely divided by stirring with water and dyed, with boiling, onto fibres of polyethylene-terephthalate, with the addition of a carrier such as benzoic acid. A strongly reddish yellow dyeing of good fastness properties is thus obtained.

Example 3

The dyestuff obtainable in usual manner by coupling diazotized 1-amino-2 - cyan - 5 - chlorobenzene with 2-methylindole is adjusted with a dispersing agent, thoroughly pasted by stirring with warm water and added to the dyebath, 1 percent of the dyestuff (referred to the weight of the dyeing material) is dyed onto fibres of polyethylene-terephthalate, expediently by introducing the material into the dyebath at 50° C., slowly heating the bath to 120° C. and maintaining it at this temperature for 1 hour. After rinsing and drying, a yellow dyeing is obtained.

The dyestuffs listed in the following table also yield yellow dyeings of good fastness properties on polyterephthalic acid glycolester fibres.

| | Dyestuff | Shade on polyterephthalic acid glycolester fibres |
|---|---|---|
| (4) | 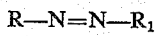 | yellowish orange. |
| (5) | | strongly reddish yellow. |
| (6) | | Do. |
| (7) | | yellowish orange. |

| Dyestuff | Shade on polyterephthalic acid glycolester fibres |
|---|---|
| (8) 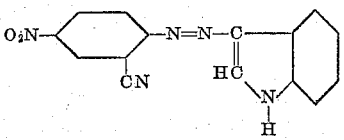 | yellow-brown. |
| (9) 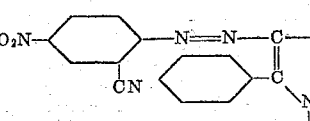 | yellowish red. |
| (10) 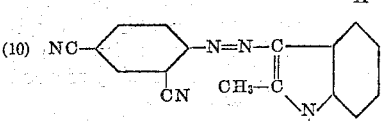 | yellow-brown. |
| (11) 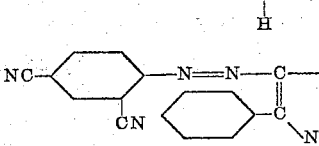 | yellowish orange. |
| (12) 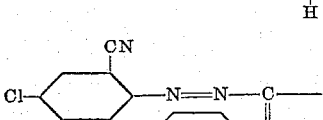 | strongly reddish orange. |
| (13) 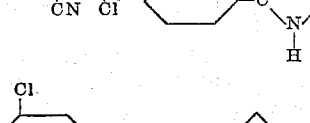 | yellow. |
| (14) 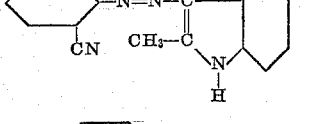 | yellowish red. |
| (15) 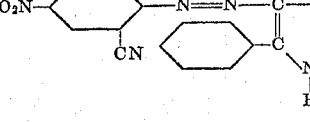 | yellowish orange. |
| (16) 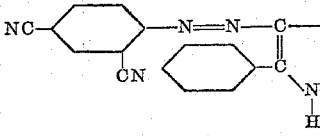 | strongly yellowish orange. |

| Dyestuff | Shade on polyterephthalic acid glycolester fibres |
|---|---|
| (17) 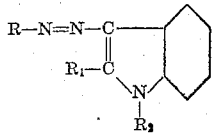 | yellow. |
| (18) 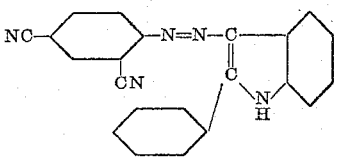 | Do. |

By the expression aromatic polyesters or polyethyleneterephthalates or polyterephthalic acid glycol esters there is understood the highly polymeric esters obtainable by heating polyethylene glycols having a chain of 2 to 10 carbon atoms, with terephthalic acid or with an ester-forming derivative thereof such as an aliphatic or an aryl ester, an acid halide or an ammonium salt.

I claim:

1. A water-insoluble monoazo dyestuff of the formula $$R-N=N-C\underset{R_1-C}{\overset{}{\underset{}{}}}\begin{matrix}\\ \diagdown \\ N\\ |\\ R_2\end{matrix}$$

wherein R stands for a cyanphenyl radical substituted by at least one member selected from the group consisting of a chloro, cyano and nitro substituent, $R_1$ stands for a member selected from the group consisting of lower alkyl and phenyl, and $R_2$ stands for a member selected from the group consisting of hydrogen and lower alkyl.

2. The monoazo dyestuff coresponding to the formula

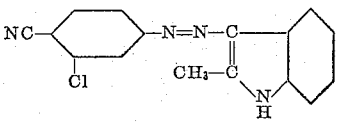

3. The monoazo dyestuff corresponding to the formula

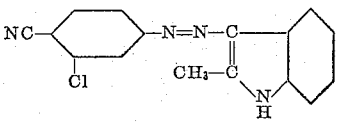

References Cited in the file of this patent

UNITED STATES PATENTS

| | | |
|---|---|---|
| 2,196,757 | Dickey | Apr. 9, 1940 |
| 2,198,002 | Dickey | Apr. 23, 1940 |
| 2,228,288 | Suckfull et al. | Jan. 14, 1941 |
| 2,424,493 | Muller et al. | July 22, 1947 |
| 2,439,798 | Dickey et al. | Apr. 20, 1948 |
| 2,512,251 | Kleene | June 20, 1950 |

FOREIGN PATENTS

| | | |
|---|---|---|
| 648,068 | France | Aug. 7, 1928 |